United States Patent
Rosenoer

(10) Patent No.: US 11,646,903 B1
(45) Date of Patent: May 9, 2023

(54) SYSTEMS AND METHODS FOR GENERATING SHELL-WRAPPED SELF-EXECUTING PROGRAMS FOR CONDUCTING CRYPTOGRAPHICALLY SECURE ACTIONS

(71) Applicant: Citibank, N.A., New York, NY (US)

(72) Inventor: Jonathan Miles Collin Rosenoer, Westport, CT (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/063,052

(22) Filed: Dec. 7, 2022

(51) Int. Cl.
*H04L 9/00* (2022.01)
*H04L 9/32* (2006.01)

(52) U.S. Cl.
CPC ............. *H04L 9/50* (2022.05); *H04L 9/3268* (2013.01)

(58) Field of Classification Search
CPC ................................ H04L 9/50; H04L 9/3268
See application file for complete search history.

(56) References Cited

U.S. PATENT DOCUMENTS

| | | | |
|---|---|---|---|
| 2020/0127834 A1* | 4/2020 | Westland | H04L 63/00 |
| 2020/0183950 A1* | 6/2020 | Gaillardetz | G06F 16/258 |
| 2020/0380505 A1* | 12/2020 | Shah | H04L 9/0643 |
| 2021/0034639 A1* | 2/2021 | Gaillardetz | H04L 9/3239 |
| 2021/0073288 A1* | 3/2021 | Hunter | G06F 9/547 |
| 2023/0022112 A1* | 1/2023 | Beveridge | H04L 9/16 |
| 2023/0049791 A1* | 2/2023 | Bunker, Jr. | H04L 9/50 |

\* cited by examiner

*Primary Examiner* — Yonas A Bayou
(74) *Attorney, Agent, or Firm* — Perkins Coie LLP

(57) ABSTRACT

Systems and methods for generating shell-wrapped self-executing programs for conducting cryptographically secure blockchain actions on public, non-permissioned blockchain networks that are cryptographically secure. For example, the shell-wrapped self-executing program may comprise a shell program and the self-executing program. The shell program may contain and output one or more validation characteristics about the self-executing program and coupled data input systems (e.g., oracles) in response to a query about accessing the self-executing program. As such, any entity (e.g., a legacy computing system and/or another self-executing program) that requests to access the self-executing program may first receive information about the validation (if any) of the self-executing program.

20 Claims, 5 Drawing Sheets

100

1. #!/bin/bash
2. If
3.     [ $# -ne "$val.char"]
4. Then
5.     [file_name=$1]

102

104

1. Pragma solidity >=0.4.22 <0.7.0
2. Contract EtherB {
3.     mapping (address => uint256) public balance;
4.     function deposit () external payable {
5.     require (balance[msg.sender] + msg.value >= balances [msg.sender]);
6.     balances [msg.sender] += msg.values;
7. }

SYSTEMS AND METHODS FOR GENERATING SHELL-WRAPPED SELF-EXECUTING PROGRAMS FOR CONDUCTING CRYPTOGRAPHICALLY SECURE ACTIONS

BACKGROUND

With the rise in electronic communications and the diverse types of actions that are now performed by electronic communications, the threat of adverse or unauthorized parties accessing the electronic communications has also risen. To combat this threat, electronic communications frequently use some form of encryption and/or cryptographic security to thwart these adverse or unauthorized parties. One such type of cryptographic security is provided by blockchains and blockchain technology.

A blockchain is a decentralized ledger of transactions built upon a combination of cryptography techniques (e.g., secret-keys, hash functions, etc.), consensus mechanisms (e.g., Proof of Work, Proof of Stake, Endorsement/Ordering/Validation, etc.), and computer networks (e.g., peer-to-peer ("P2P") networks, the Internet, etc.). The blockchain stores information electronically, grouped together into a series of subsets of the information, called "blocks." The information may be maintained by a network of computers using cryptography and consensus mechanisms, which make the records difficult to hack or alter. Specifically, the integrity of the information in each block may be maintained through one-way cryptographic functions that make the information immutable for practical purposes.

As blocks of information are added, the various blocks form a chain, which represents an immutable record of all the previous transactions across the network. Given the relative immutability of the records, the blockchain does not necessarily require a central authority to monitor transactions, maintain records, and/or enforce rules. As such, blockchains and blockchain technology has become a foundation of what may be described as a next generation compute platform, particularly when enhanced with self-executing programs (e.g., "smart contracts"). These self-executing programs are stored on a blockchain and run when predetermined conditions are met.

SUMMARY

Despite the technological breakthrough that blockchain and blockchain technology represents, practical implementations of blockchain technology have been hindered by several technical problems. For example, the predetermined conditions and resulting actions from the execution of the self-executing programs are, in fact, encoded into them and cannot be changed after they are published to a blockchain. This raises serious security concerns because they can then be analyzed for flaws to be used for malicious attacks. These security concerns, in turn, present challenges to integrating blockchain technology into traditional, centralized software infrastructures.

Furthermore, public, non-permissioned networks may allow any user to publish a self-executing program. This means that unknown third parties can install self-executing programs that execute on all network nodes without explicit permission of any first party node owner. These self-executing programs permanently reside on the blockchain and cannot be changed or deleted. Even if the third party is known, it is not generally known by the first party node owner who, in fact, coded the self-executing program and whether the code is fit for its purpose. This is a particular concern because due to the relative newness of blockchains and associated tools, self-executing programs can be hard to code and debug prior to installation.

Currently, it is well known that self-executing programs are vulnerable to coding errors that may cause unexpected behavior and prove exploitable by attackers. Additionally, to the extent that many coders use open-source software, there is a further risk that this code has been compromised, or that embedded licensing restrictions may cause adverse impacts, which may corrupt not only the self-executing program, but the blockchain itself. To further exacerbate this problem, analyzing the self-executing programs' codes prior to executing can also run the risk of corruption or unexpected behavior. An additional concern is that the self-executing program may link to, and input data from, an external data source (e.g., an oracle), that might be susceptible to tampering.

One solution to overcoming the aforementioned technical problem is through the use of a permissioned blockchain. For example, conventional permissioned blockchains require devices and/or accounts accessing the blockchains to have particular security credentials/certificates. Thus, only devices and/or accounts that have previously received permission may access the blockchain, conduct transactions, and view information on the blockchain.

However, even using a private, permissioned blockchain, the pedigree and provenance of the code and identity of the coder working on behalf of a third party may not be known. Further, using a private, permissioned blockchain limits the amount and number of devices and/or accounts that may use the blockchain, as well as the devices and/or accounts that may take part in a transaction using the blockchain. For example, a significant limitation to a permissioned blockchain is that self-executing programs may only conduct transactions with devices and/or accounts that already have the required permissions. This is particularly problematic for conducting transactions with devices and/or accounts worldwide that may not have previously obtained the required permissions.

In contrast, the systems and methods described herein obtain the security advantages of the blockchain not only on a device and/or account level, but on a network-wide level. The system uses shell-wrapped self-executing programs, which do not necessarily require a permissioned blockchain. For example, the shell-wrapped self-executing program may comprise a shell program and the self-executing program. The shell program may contain and output one or more validation characteristics about the self-executing program and coupled data input and protocol implementation systems (e.g., oracles, protocol bricks, and/or blockchain bridges) in response to a query about accessing the self-executing program. As such, any entity (e.g., a legacy computing system and/or another self-executing program) that requests to access the self-executing program may first receive information about the validation (if any) of the self-executing program and associated resources. For example, such validation may cover subjects such as functionality verification (e.g., formal verification), performance optimization and minimization of network resource usage, potential security vulnerabilities, and lack of trustworthy data feeds (e.g., security, data correctness). As the request is interfacing with the shell program as opposed to the underlying self-executing program, the request does not run the risk of corruption or unexpected behavior by accessing the code of the self-executing program directly. Accordingly, any entity wishing to access self-executing programs on a blockchain may first interface with the shell program to negate the existence of a potential risk associated with the underlying self-executing program. By doing so, the entity may receive an output from the shell program indicating a particular validation method, validation protocol, and/or source of the self-executing program or its underlying code and associated resources.

The systems and methods described herein include a system used to read the characteristics of the self-executing programs on a blockchain and their associated resources (e.g., oracles, centralized databases, blockchain bridges). This system will continuously traverse one or more blockchain and scan, analyze, classify, map and monitor (e.g., for changes) the topology of self-executing programs and associated resources across each and all of them. This information can be output to a first party security information and event management module that, according to an associated rules engine, will proactively grant access rights to self-executing program that provide sufficient validation information and restrict traffic to those that do not.

In some aspects, systems and methods for generating shell-wrapped self-executing programs for conducting cryptographically secure smart contract execution on blockchains. For example, the system may receive a self-executing program for publication on a blockchain. The system may receive a cryptographically secure validation characteristic, wherein the validation characteristic indicates an input for entities attempting to validate the self-executing program. The system may generate a shell program for interacting with a request to access the self-executing program, wherein the shell program outputs the validation characteristic in response to the request. The system may generate a shell-wrapped self-executing program by digitally wrapping the self-executing program with the shell program. The system may publish the shell-wrapped self-executing program to the blockchain.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
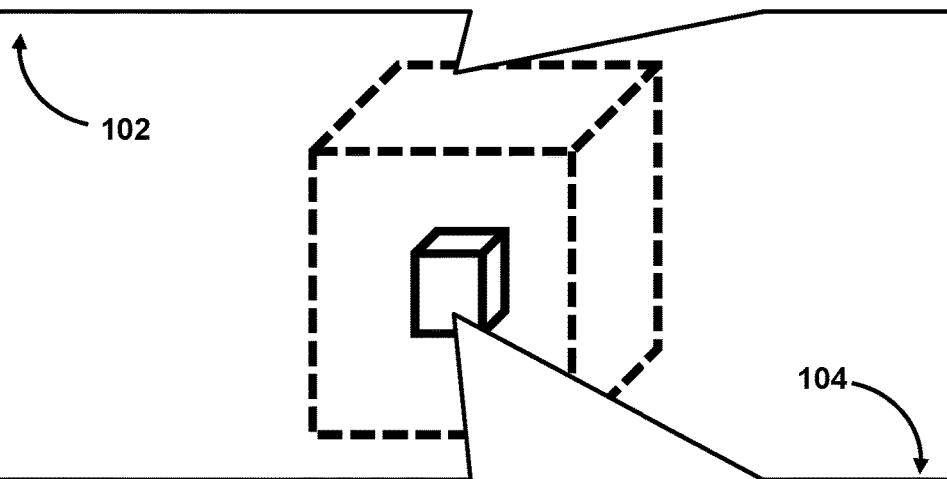
FIG. 1 shows an illustrative diagram of a shell-wrapped self-executing program, in accordance with one or more embodiments.

FIG. 1 shows an illustrative diagram of a shell-wrapped self-executing program, in accordance with one or more embodiments. For example, FIG. 1 shows shell-wrapped self-executing program 100. Shell-wrapped self-executing program 100 comprises shell program 102 and self-executing program 104.

As referred to herein, a "shell-wrapped self-executing program" may comprise a self-executing program that combines one or more individual self-executing programs and one or more shell programs. In some embodiments, the shell-wrapped self-executing program may comprise a self-executing program that is itself digitally wrapped by a shell program. For example, a shell-wrapped self-executing program may be a compiled self-executing program that is wrapped (e.g., encrypted by) a shell program. The shell program may provide information related to the underlying self-executing program without a requesting entity needing to query the underlying self-executing program. In some embodiments, a self-executing program in the shell-wrapped self-executing program may be backed 1:1 by a shell program. By doing so, the system maintains the public nature and accessibility of the blockchain, but still allows for security to be maintained through requirements of particular security credentials/certificates for each shell-wrapped self-executing program. Additionally, it removes the need for devices and/or accounts to have previously obtained the required permissions to access the blockchain itself and instead enforces the requirement for particular security credentials/certificates only upon execution of the shell-wrapped self-executing program and in real-time.

As referred to herein, a "self-executing program" of "smart contract" may comprise a program in which rules for execution are written into lines of code. The code and the rules contained therein may then exist across a distributed, decentralized blockchain network. For example, a self-executing program may comprise a contract in which the terms of the agreement between buyer and seller are written into lines of code.

A self-executing program may be programmed to perform a blockchain action automatically in response to a predetermined condition being met. As referred to herein, a "blockchain action" may comprise any action including and/or related to blockchains and blockchain technology. For example, blockchain actions may include conducting transactions, querying a distributed ledger, generating additional blocks for a blockchain, transmitting communications-related nonfungible tokens, performing encryption/decryption, exchanging public/private keys, and/or other actions related to blockchains and blockchain technology. In some embodiments, a blockchain action may comprise the creation, modification, detection, and/or execution of a smart contract or program stored on a blockchain. For example, a smart contract may comprise a program stored on a blockchain that is executed (e.g., automatically and/or without any intermediary's involvement or time loss) when one or more predetermined conditions are met. In some embodiments, a blockchain action may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology. In some embodiments, blockchain actions may also comprise actions related to mechanisms that facilitate other blockchain actions (e.g., actions related to metering activities for blockchain actions on a given blockchain network).

In some embodiments, gas may be obtained as part of a blockchain action (e.g., a purchase) using a network-specific cryptocurrency (e.g., ether in the case of Ethereum). The system may require gas (or the amount of the network-specific cryptocurrency corresponding to the required amount of gas) to be transmitted with the blockchain action as an earmark to the blockchain action. In some embodiments, gas that is earmarked for a blockchain action may be refunded back to the originator of the blockchain action if, after the computation is executed, an amount remains unused.

As referred to herein, a "shell program" may comprise a program which provides an interface between a request of a requesting entity and a self-executing program. For example, a shell program may comprise a shell script that embeds a system command or utility that accepts and/or passes a set of parameters to that command. As one example, the shell program may provide information to a requesting entity about the validation (if any) of the underlying self-executing program.

For example, as discussed above, public, non-permissioned blockchain networks may allow any entity (e.g., user, system, etc.) to publish a self-executing program. As such, an entity (whether known or unknown) may publish self-executing programs that execute on all blockchain nodes without explicit permission of any blockchain node owner or other entity. These smart contracts permanently reside on the blockchain and cannot be changed or deleted.

Due to the novelty of the technology, self-executing programs are vulnerable to coding errors that may cause unexpected behavior and prove exploitable by attackers. Additionally, or alternatively, to the extent that many coders use open-source software, there is a further risk that this code has been compromised, or that embedded licensing restrictions may cause adverse impacts, which may corrupt not only the self-executing program, but the blockchain itself. To further exacerbate this problem, analyzing the self-executing programs' codes prior to executing can also run the risk of corruption or unexpected behavior. An additional concern is that the self-executing program may link to, and input data from, an external data source (e.g., an oracle), that might be susceptible to tampering.

To account for these issues, the system uses shell-wrapped self-executing programs. The shell-wrapped self-executing program may comprise a shell program and the self-executing program. The shell program may contain and output one or more validation characteristics about the self-executing program and coupled data input systems (e.g., oracles) in response to a query about accessing the self-executing program. For example, a requesting entity may query a shell program of a shell-wrapped self-executing program requesting a required validation characteristic prior to requesting that a self-executing program of the shell-wrapped self-executing program perform a first blockchain action. In response to the query, the shell program may transmit validation characteristic for the self-executing program to the requesting entity. The requesting entity may then determine, based on the validation characteristic, whether the shell-wrapped self-executing program (or the validation characteristic or self-executing program themselves) corresponds to the required validation characteristic.

As such, any entity (e.g., a legacy computing system and/or another self-executing program) that requests to access the self-executing program may first receive information about the validation (if any) of the self-executing program. For example, such validation may cover subjects such as functionality verification (e.g., formal verification), performance optimization and minimization of network resource usage, potential security vulnerabilities, and lack of trustworthy data feeds (e.g., security, data correctness). As the request is interfacing with the shell program as opposed to the underlying self-executing program, the request does not run the risk of corruption (e.g., of an accessing system) or unexpected behavior by accessing the code of the self-executing program directly. Accordingly, any entity wishing to access self-executing programs on a blockchain may first interface with the shell program to determine a risk associated with the underlying self-executing program. By doing so, the entity may receive an output from the shell program indicating a particular validation method, validation protocol, and/or source of the self-executing program or its underlying code. For example, the shell program may output one or more validation characteristics.

As described herein, a "validation characteristic" may comprise any characteristic of a shell program, self-executing program, and/or combination thereof (including its underlying code) that distinguishes it from another shell program, self-executing program, and/or combination thereof (including its underlying code). For example, a validation characteristic may comprise a security certificate, a specific code origination identifier, a specific program validator, a specific digital asset, a specific signing procedure, a number of signatures, and/or other validation characteristics described herein.

In some embodiments, a validation characteristic may be compared against a "required validation characteristic." For example, a required validation characteristic may comprise a validation characteristic required by a requesting entity in order for the requesting entity to use a self-executing program. For example, a required validation characteristic may comprise a required security certificate, a required code origination identifier, a required program validator, a required digital asset, a required signing procedure, a required number of signatures, and/or other required validation characteristics described herein.

The use of the shell-wrapped self-executing program also provides additional technical benefits. For example, by wrapping a self-executing program (e.g., comprising the transaction details for the underlying transaction) within a shell program (e.g., indicating validation characteristic), the shell program may not only enforce requirements for particular security credentials/certificates, but may also enforce other requirements on the underlying transaction. These other requirements may include obfuscating specific details related to the transaction from publication on the blockchain (e.g., to preserve privacy), providing additional execution requirements (e.g., based on know-your-customer protocols, government regulations, etc.), and/or providing additional functionality (e.g., generating supplemental notifications, triggering other transactions, etc.). For example, one shell program of the shell-wrapped self-executing program may add a specific privacy requirement that causes an interest rate in a transaction to be hidden, but still allows for the transaction itself to be validated and recorded on the blockchain. The shell program may accomplish this by encrypting the underlying self-executing program such that it is not public despite the shell-wrapped self-executing program being published to the blockchain.

The use of the shell-wrapped self-executing program also provides yet additional technical benefit in that while it does not require a permissioned blockchain, it also does not require a layer two blockchain solution to achieve the aforementioned benefits. As such, the shell-wrapped self-executing program is a layer one blockchain solution (e.g., an on-chain networking solution that may process and complete blockchain actions on its own blockchain) that works within existing protocols and does not require additional architecture on top of an existing blockchain. Accordingly, the shell-wrapped self-executing program is highly flexible and scalable.

Figure 2:
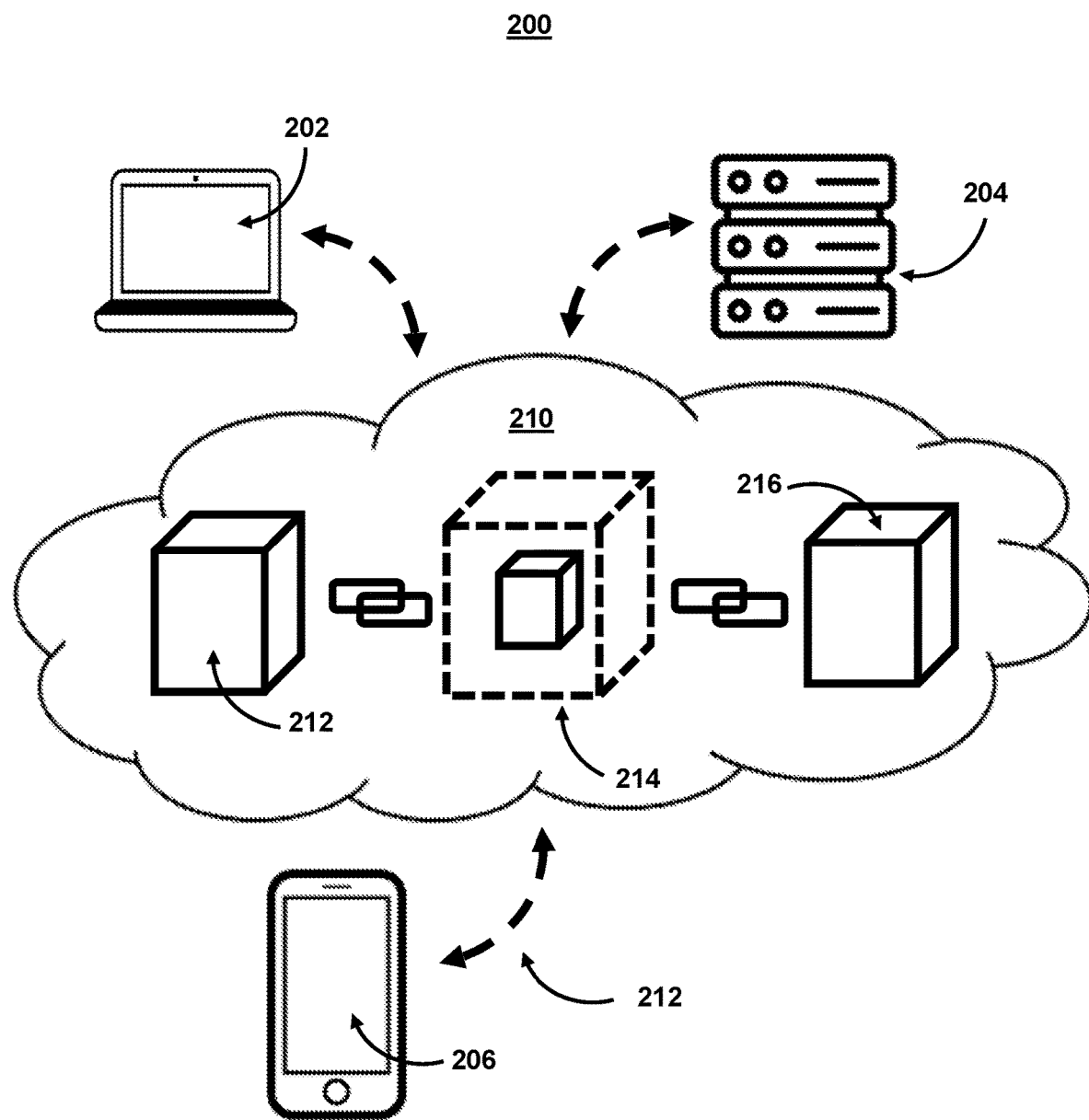
FIG. 2 shows an illustrative diagram of a blockchain network, in accordance with one or more embodiments.

FIG. 2 shows an illustrative diagram of a blockchain network, in accordance with one or more embodiments. For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by one or more client, which behaves like an actual computer) for the system. The data structure may comprise one or more devices and/or components, which may act in concert to facilitate blockchain 210.

As referred to herein, blockchain 210 may comprise a type of distributed ledger technology that consists of a growing list of records and/or blocks (e.g., block 212, block 214, and block 216), that are securely linked together using cryptography. Each block may contain a cryptographic hash of the previous block (e.g., block 216 may contain a cryptographic hash of block 214), and that cryptographic hash may itself be based on a state of a preceding block (e.g., the cryptographic hash of block 216 is based not only on the state of block 214, but also block 212). For example, each block may include a timestamp and blockchain action data (e.g., represented as a Merkle tree, where data nodes are represented by leaves). The timestamp proves that the blockchain action data (e.g., the state of the block) existed when the block was created. As each block is based on information about the previous block, the blocks effectively form a chain with each additional block linking to the ones before it. Consequently, blockchain actions are irreversible in that, once they are recorded, the data in any given block cannot be altered retroactively without altering all subsequent blocks. Furthermore, as shown in FIG. 2, block 214 may comprise a shell-wrapped self-executing program. It should be noted that the shell-wrapped self-executing program may be embedded within block 214 with other self-executing programs and/or other data.

Blockchains are typically managed by a peer-to-peer (P2P) computer network for use as a public distributed ledger, where nodes collectively adhere to a consensus algorithm protocol to add and validate new transaction blocks. Although, in some embodiments, a blockchain may be managed by a private consortium of computers. While blockchain records are not unalterable, since blockchain forks are possible, blockchains may be considered secure by design and exemplify a distributed computing system with high Byzantine fault tolerance.

As shown in FIG. 2, system 200 comprises user device 202, user device 204, and user device 206. It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain action may equally be applied to, and correspond to, an individual user device (e.g., user device 202, user device 204, and/or user device 206) performing the blockchain action. That is, system 200 may correspond to the user devices (e.g., user device 202, user device 204, and/or user device 206) collectively or individually.

For example, system 200 may comprise a plurality of nodes for blockchain 210. Each node may correspond to a user device (e.g., user device 202, user device 204, and/or user device 206). A node for a blockchain network may comprise an application or other software that records and/or monitors peer connections to other nodes and/or miners for the blockchain network. For example, a miner comprises a node in a blockchain network that facilitates blockchain actions by verifying blockchain actions on the blockchain, adding new blocks to the existing chain, and/or ensuring that these additions are accurate. The nodes may continually record the state of the blockchain and respond to remote procedure requests for information about the blockchain.

In some embodiments, the user devices of system 200 may comprise one or more cloud components. For example, cloud components may be implemented as a cloud computing system and may feature one or more component devices. It should also be noted that system 200 is not limited to three devices. Users may, for instance, utilize one or more devices to interact with one another, one or more servers, or other components of system 200. It should be further noted that while one or more actions (e.g., blockchain actions) are described herein as being performed by a particular component (e.g., user device 202) of system 200, those actions may, in some embodiments, be performed by other components of system 200. As an example, while one or more actions are described herein as being performed by components of user device 202, those actions may, in some embodiments, be performed by one or more cloud components. In some embodiments, the various computers and systems described herein may include one or more computing devices that are programmed to perform the described functions. Additionally, or alternatively, multiple users may interact with system 200 and/or one or more components of system 200. For example, in one embodiment, a first user and a second user may interact with system 200 using two different components (e.g., user device 204 and user device 206, respectively). Additionally, or alternatively, a single user (and/or a user account linked to a single user) may interact with system 200 and/or one or more components of system 200 using two different components (e.g., user device 202 and user device 206, respectively).

With respect to the components of system 200, each of these devices may receive content and data via input/output (I/O) paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 2, both user device 202 and user device 206 include a display upon which to display data (e.g., content related to one or more blockchain actions).

Additionally, the devices in system 200 may run an application (or another suitable program). The application may cause the processors and/or control circuitry to perform operations related to use of shell-wrapped self-executing programs within a decentralized application environment.

Each of these devices may also include electronic storage. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes blockchain 210, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 3:
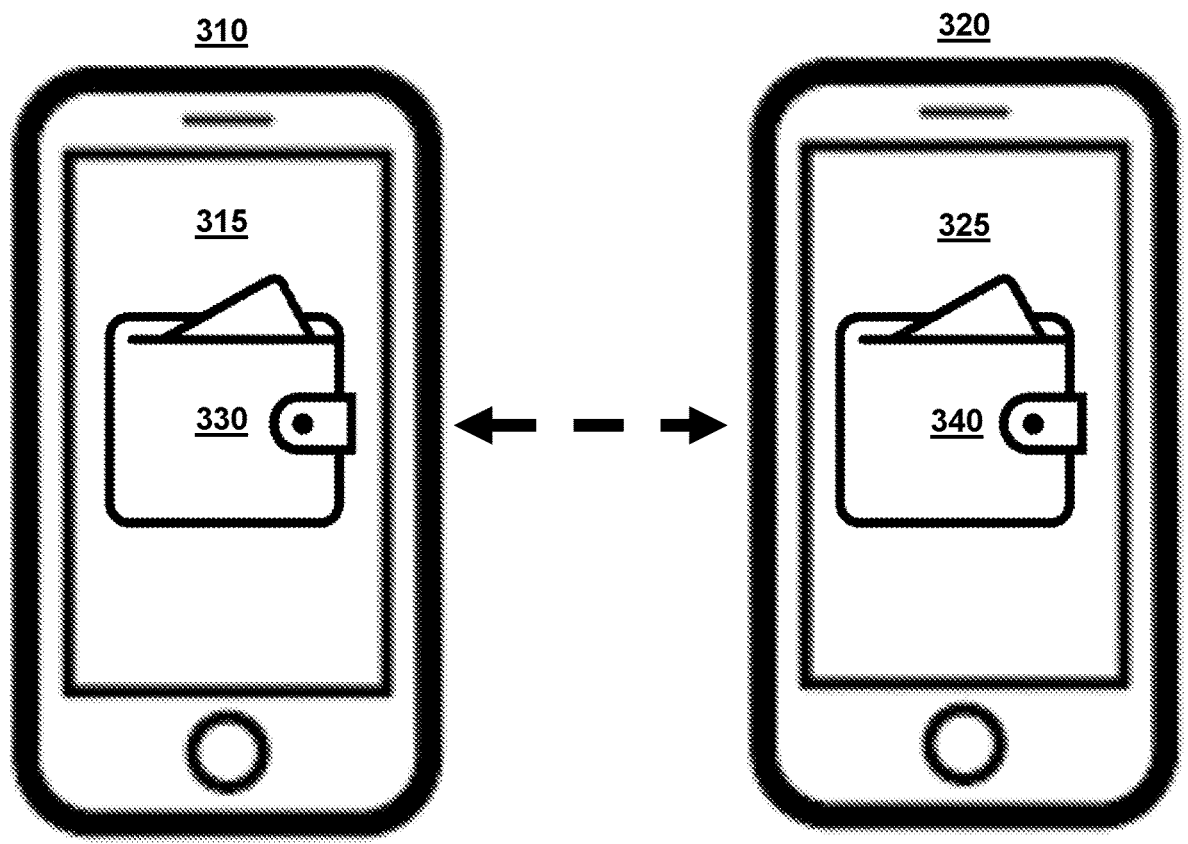
FIG. 3 shows an illustrative diagram for performing a blockchain action, in accordance with one or more embodiments.

FIG. 3 shows an illustrative diagram for conducting blockchain actions, in accordance with one or more embodiments. For example, the diagram presents various components that may be used to facilitate blockchain actions using shell-wrapped self-executing programs, in some embodiments. FIG. 3 includes system 300, which includes user device 310 and user device 320, although other devices and/or components may also be featured in system 300 (e.g., one or more of devices and/or components shown in FIG. 2). User device 310 includes user interface 315. User device 320 includes user interface 325. As referred to herein, a "user interface" may comprise a mechanism for human-computer interaction and communication in a device and may include display screens, keyboards, a mouse, and the appearance of a desktop. For example, a user interface may comprise a way for a user to interact with and/or access an application, website, and/or other program in order to facilitate blockchain actions using shell-wrapped self-executing programs. A user interface may display content related to facilitate blockchain actions using shell-wrapped self-executing programs. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

As shown in FIG. 3, one or more user devices may include a cryptography-based storage application (e.g., cryptography-based storage application 330 and cryptography-based storage application 340) used to perform blockchain actions. The cryptography-based storage application may be used to perform a plurality of blockchain actions across a computer network. For example, the cryptography-based storage application may comprise a decentralized application that functions to perform one or more blockchain actions.

In some embodiments, the cryptography-based storage application may comprise and/or be compatible with one or more application program interfaces (APIs). For example, an API may be implemented on user device 310 and/or communicate with an API implemented on user device 320. Alternatively, or additionally, an API may reside on one or more cloud components. For example, an API may reside on a server and comprise a platform service for a custodial wallet service, decentralized application, etc. An API (which may be a representational state transfer (REST) or web services API layer) may provide a decoupled interface to data and/or functionality of one or more applications.

The API may provide various low-level and/or blockchain-specific operations in order to facilitate blockchain actions using shell-wrapped self-executing programs. For example, the API may provide blockchain actions such as blockchain writes. Furthermore, the API may perform a transfer validation ahead of forwarding the blockchain action (e.g., a transaction) to another service (e.g., a crypto service). The API may then log the outcome. For example, by logging to the blockchain prior to forwarding, the API may maintain internal records and balances without relying on external verification (e.g., which may take up to ten minutes based on blockchain updating activity).

The API may also provide informational reads. For example, the API (or a platform service powered by the API) may generate blockchain action logs and write to an additional ledger (e.g., an internal record and/or indexer service) the outcome of the reads. If this is done, a user accessing the information through other means may see consistent information such that downstream users ingest the same data point as the user. The API may also provide a unified API to access balances, transaction histories, and/or other blockchain actions activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

The API may provide a common, language-agnostic way of interacting with an application. In some embodiments, the API may comprise a web services API that offers a well-defined contract that describes the services in terms of their operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in business-to-business (B2B) transactions.

The API may use various architectural arrangements. For example, system 300 may be partially based on the API, such that there is strong adoption of SOAP and RESTful web services, using resources such as Service Repository and Developer Portal, but with low governance, standardization, and separation of concerns. Alternatively, system 300 may be fully based on the API, such that separation of concerns between layers such as an API layer, services, and applications are in place.

In some embodiments, the system architecture may use a microservice approach. Such systems may use two types of layers: front-end layers and back-end layers, where microservices reside. In this kind of architecture, the role of the API may be to provide integration between front-end and back-end layers. In such cases, the API may use RESTful APIs (exposition to front-end or even communication between microservices). The API may use the Advanced Message Queuing Protocol (AMQP), which is an open standard for passing business messages between applications or organizations. The API may use an open-source, high-performance remote procedure call (RPC) framework that may run in a decentralized application environment. In some embodiments, the system architecture may use an open API approach. In such cases, the API may use commercial or open-source API platforms and their modules. The API may use a developer portal. The API may use strong security constraints applying a web application firewall that protects the decentralized applications and/or the API against common web exploits, bots, and denial-of-service (DDoS) attacks. The API may use RESTful APIs as standard for external integration.

In some embodiments, the system may also use one or more Application Binary Interfaces (ABIs) as an alternative to and/or in addition to an API. An ABI is an interface between two program modules, often between operating systems and user programs. ABIs may be specific to a blockchain protocol. For example, ABI defines the methods and structures used to interact with the binary contract similar to an API, but on a lower level. The ABI indicates the caller of the function to encode (e.g., ABI encoding) the needed information, like function signatures and variable declarations in a format that a virtual machine can understand, to call that function in bytecode. ABI encoding may be automated by the system using compilers or wallets interacting with the blockchain.

The cryptography-based storage application may, in some embodiments, correspond to a digital wallet. For example, the digital wallet may comprise a repository that allows users to store, manage, and trade their cryptocurrencies and assets, interact with blockchains, and/or conduct blockchain actions using one or more applications. The digital wallet may be specific to a given blockchain protocol or may provide access to multiple blockchain protocols. In some embodiments, the system may use various types of digital wallets, such as hot wallets and cold wallets. Hot wallets are connected to the Internet while cold wallets are not. Digital wallet holders may hold both a hot wallet and a cold wallet. Hot wallets are most often used to perform blockchain actions, while a cold wallet is generally used for managing a user account and may have no connection to the Internet.

In some embodiments, the cryptography-based storage application may correspond to a key-based wallet or a smart contract wallet. For example, a key-based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain actions. In some embodiments, a cryptography-based storage application may include, or have access to, a key-based wallet or a smart contract wallet. For example, the cryptography-based storage application may comprise a digital or other construct (e.g., a reference, a pointer, a text on a blockchain, an address, etc.).

In some embodiments, to conduct a blockchain action, user device 310, user interface 315, and/or cryptography-based storage application 330 may comprise, control, and/or have access to a private key and/or digital signature. For example, system 300 may use cryptographic systems for conducting blockchain actions using shell-wrapped self-executing programs. For example, system 300 may use public-key cryptography, which features a pair of digital keys (e.g., which may comprise strings of data). In such cases, each pair comprises a public key (e.g., which may be public) and a private key (e.g., which may be kept private). System 300 may generate the key pairs using cryptographic algorithms (e.g., featuring one-way functions). System 300 may then encrypt a message (or other blockchain action) using an intended receiver's public key such that the encrypted message may be decrypted only with the receiver's corresponding private key. In some embodiments, system 300 may combine a message with a private key to create a digital signature on the message. For example, the digital signature may be used to verify the authenticity of blockchain actions. As an illustration, when conducting blockchain actions, system 300 may use the digital signature to prove to every node in the system that it is authorized to conduct the blockchain actions.

For example, user device 310 may request a blockchain action (e.g., conduct a transaction). The blockchain action may be authenticated by user device 310 and/or another node (e.g., a user device in the community network of system 300). For example, using cryptographic keys, system 300 may identify users and give access to their respective user accounts (e.g., corresponding digital wallets) within system 300. Using private keys (e.g., known only to the respective users) and public keys (e.g., known to the community network), system 300 may create digital signatures to authenticate the users.

Following an authentication of the blockchain action, the blockchain action may be authorized. For example, after the blockchain action is authenticated between the users, system 300 may authorize the blockchain action prior to adding it to the blockchain. System 300 may add the blockchain action to a blockchain (e.g., blockchain 210 (FIG. 2)) as part of a new block (e.g., block 216 (FIG. 2)). System 300 may perform this based on a consensus of the user devices within system 300. For example, system 300 may rely on a majority (or other metric) of the nodes in the community network to determine that the blockchain action is valid. In response to validation of the block, a node user device (e.g., user device 320) in the community network (e.g., a miner) may receive a reward (e.g., in a given cryptocurrency) as an incentive for validating the block.

To validate the blockchain action, system 300 may use one or more validation protocols and/or validation mechanisms. For example, system 300 may use a proof-of-work mechanism in which a user device must provide evidence that it performed computational work to validate a blockchain action and thus this mechanism provides a manner for achieving consensus in a decentralized manner, as well as preventing fraudulent validations. For example, the proof-of-work mechanism may involve iterations of a hashing algorithm. The user device that is successful aggregates and records blockchain actions from a mempool (e.g., a collection of all valid blockchain actions waiting to be confirmed by the blockchain network) into the next block. Alternatively, or additionally, system 300 may use a proof-of-stake mechanism in which a user account (e.g., corresponding to a node on the blockchain network) is required to have, or "stake," a predetermined amount of tokens in order for system 300 to recognize it as a validator in the blockchain network.

In response to validation of the block, the block is added to a blockchain (e.g., blockchain 210 (FIG. 2)), and the blockchain action is completed. For example, to add the blockchain action to blockchain, the successful node (e.g., the successful miner) encapsulates the blockchain action in a new block before transmitting the block throughout system 300.

In some embodiments, a cryptography-based storage application may comprise a decentralized application. As referred to herein, a "decentralized application" may comprise an application that exists on a blockchain and/or a peer-to-peer network. For example, a decentralized application may comprise an application that has a back end that is in part powered by a decentralized peer-to-peer network, such as a decentralized, open-source blockchain with smart contract functionality.

For example, the cryptography-based storage application (e.g., cryptography-based storage application 330) may allow a user device (e.g., user device 310) to share files, access, and/or perform a blockchain action with another user device (e.g., user device 320) and/or cryptography-based storage application (e.g., cryptography-based storage application 340). For example, the peer-to-peer architecture and decentralized nature allows blockchain actions to be conducted between the user devices, without the need of any intermediaries or central authorities.

Figure 4:
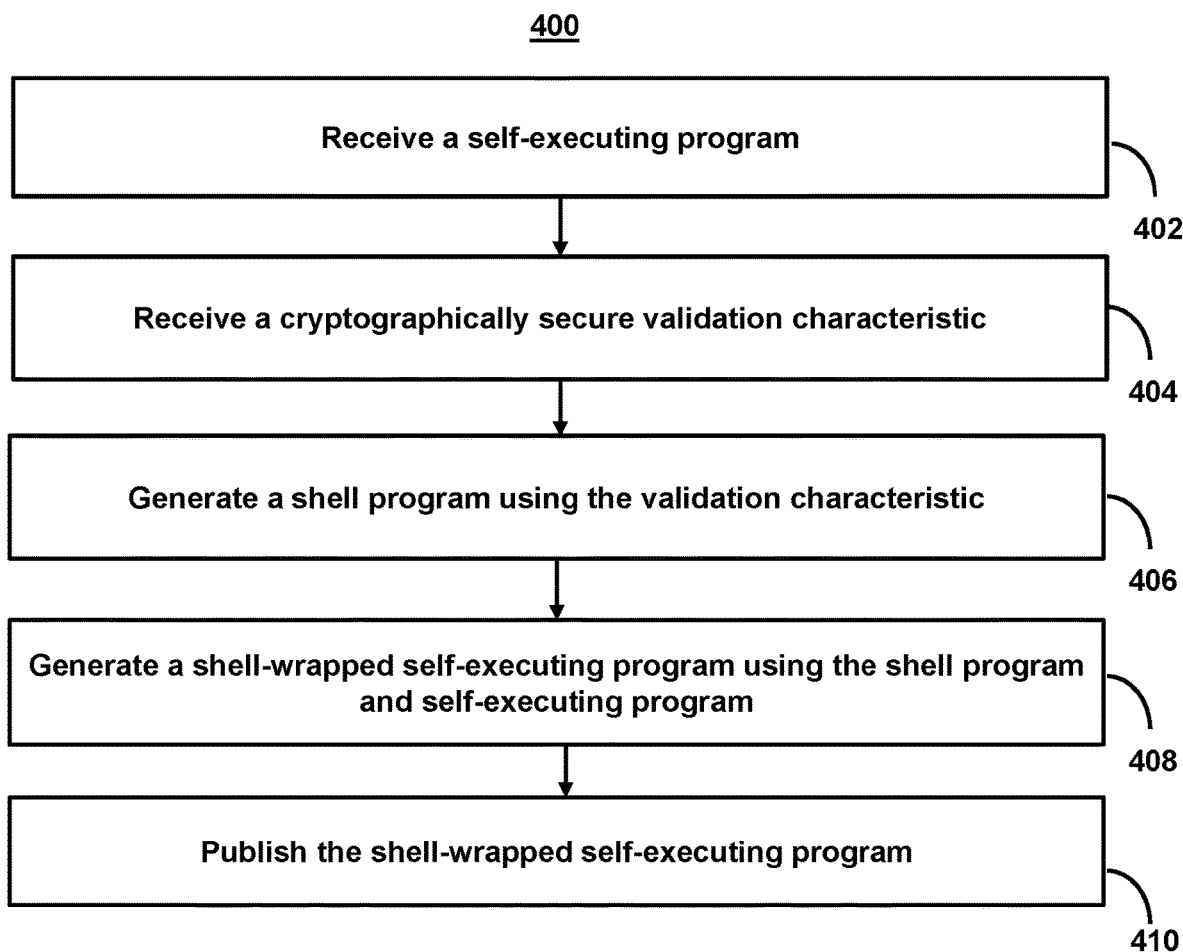
FIG. 4 shows a flowchart of the steps involved in generating shell-wrapped self-executing programs, in accordance with one or more embodiments.

FIG. 4 shows a flowchart of the steps involved in generating shell-wrapped self-executing programs, in accordance with one or more embodiments. For example, the system may use process 400 (e.g., as implemented on one or more system components described above) in order to generate shell-wrapped self-executing programs for conducting cryptographically secure blockchain actions on public, non-permissioned blockchain networks that are cryptographically secure. For example, the shell-wrapped self-executing program may comprise a self-executing program that is created based on the compiling of a shell program and a self-executing program. For example, the system may receive an uncompiled version of the shell program. The system may also receive an uncompiled version of the self-executing program. The system may compile the shell program and the self-executing program to generate the shell-wrapped self-executing program.

At step 402, process 400 (e.g., using one or more components described above) receives a self-executing program.

For example, the system may receive a self-executing program for publication in an encrypted format on a cryptographically secure network. For example, the shell-wrapped self-executing program may maintain its underlying self-executing program in an encrypted state through the use of homomorphic encryption. As such, the self-executing program may remain private in a public, non-permissioned blockchain, prior to the self-executing program, of the shell-wrapped self-executing program, being executed. Alternatively, or additionally, the self-executing program may be hosted external to the blockchain in a protected processing environment that may be accessed via the shell program.

In such cases, any API connections to a self-executing program may be encrypted and secured, so that they could not be intercepted. For example, the self-executing program may be stored in an encrypted format. Data received and/or transmitted to one or more locations (e.g., an oracle) may also be encrypted. Furthermore, the protected processing environment may prevent leakage of data. With respect to outputs, the output API path may also be encrypted.

At step 404, process 400 (e.g., using one or more components described above) receives a cryptographically secure validation characteristic. For example, the system may receive a cryptographically secure validation characteristic, wherein the validation characteristic indicates an input for entities attempting to validate the self-executing program.

For example, the shell-wrapped self-executing program may comprise a shell program and the self-executing program. The shell program may contain and output one or more validation characteristics about the self-executing program and coupled data input systems (e.g., oracles) in response to a query about accessing the self-executing program. For example, a requesting entity may query a shell program of a shell-wrapped self-executing program requesting a required validation characteristic prior to requesting that a self-executing program of the shell-wrapped self-executing program perform a first blockchain action. In response to the query, the shell program may transmit validation characteristic for the self-executing program to the requesting entity. The requesting entity may then determine, based on the validation characteristic, whether the shell-wrapped self-executing program (or the validation characteristic or self-executing program themselves) corresponds to the required validation characteristic.

At step 406, process 400 (e.g., using one or more components described above) generates a shell program using the validation characteristic. For example, the system may generate a shell program for interacting with requests to access the self-executing program, wherein the shell program encrypts the self-executing program in the encrypted format on the cryptographically secure network, and wherein the shell program outputs the validation characteristic in response to the requests.

For example, the validation characteristic may comprise a parameter that must be satisfied prior to requesting entity executing the blockchain action using the shell-wrapped self-executing program. In some embodiments, the validation characteristic may be based on the requesting entity (e.g., a predetermined requirement of the entity) or may be based on the specific blockchain action (e.g., each action may have a specific rule, privacy requirement, government regulation, contract vetting status, etc., that is a prerequisite for executing the blockchain action using the shell-wrapped self-executing program). By doing so, the system may ensure that the underlying self-executing program meets the validation criteria and does so prior to the shell-wrapped self-executing program executing the blockchain action, as well as prior to the requesting entity interacting with the self-executing program (which may risk corrupting the requesting entity). For example, the system may determine, based on the shell program, whether the validation characteristic corresponds to a required validation characteristic. The system may use this to apply various prerequisites and/or criteria for executing the shell-wrapped self-executing program.

At step 408, process 400 (e.g., using one or more components described above) generates a shell-wrapped self-executing program using the shell program and self-executing program. For example, the system may generate a shell-wrapped self-executing program by encrypting the self-executing program in the encrypted format with the shell program. For example, by wrapping a self-executing program (e.g., comprising the transaction details for the underlying transaction) within a shell program (e.g., indicating validation characteristic), the shell program may not only enforce requirements for particular security credentials/certificates, but may also enforce other requirements on the underlying transaction. These other requirements may include obfuscating specific details related to the transaction from publication on the blockchain (e.g., to preserve privacy), providing additional execution requirements (e.g., based on know-your-customer protocols, government regulations, etc.), and/or providing additional functionality (e.g., generating supplemental notifications, triggering other transactions, etc.). For example, one shell program of the shell-wrapped self-executing program may add a specific privacy requirement that causes an interest rate in a transaction to be hidden, but still allows for the transaction itself to be validated and recorded on the blockchain. The shell program may accomplish this by encrypting the underlying self-executing program such that it is not public despite the shell-wrapped self-executing program being published to the blockchain.

At step 410, process 400 (e.g., using one or more components described above) publishes the shell-wrapped self-executing program. For example, the system may publish the shell-wrapped self-executing program to the cryptographically secure network. The use of the shell-wrapped self-executing program also provides yet additional technical benefit in that while it does not require a permissioned blockchain, it also does not require a layer two blockchain solution to achieve the aforementioned benefits. As such, the shell-wrapped self-executing program is a layer one blockchain solution (e.g., an on-chain networking solution that may process and complete blockchain actions on its own blockchain) that works within existing protocols and does not require additional architecture on top of an existing blockchain. Accordingly, the shell-wrapped self-executing program is highly flexible and scalable.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
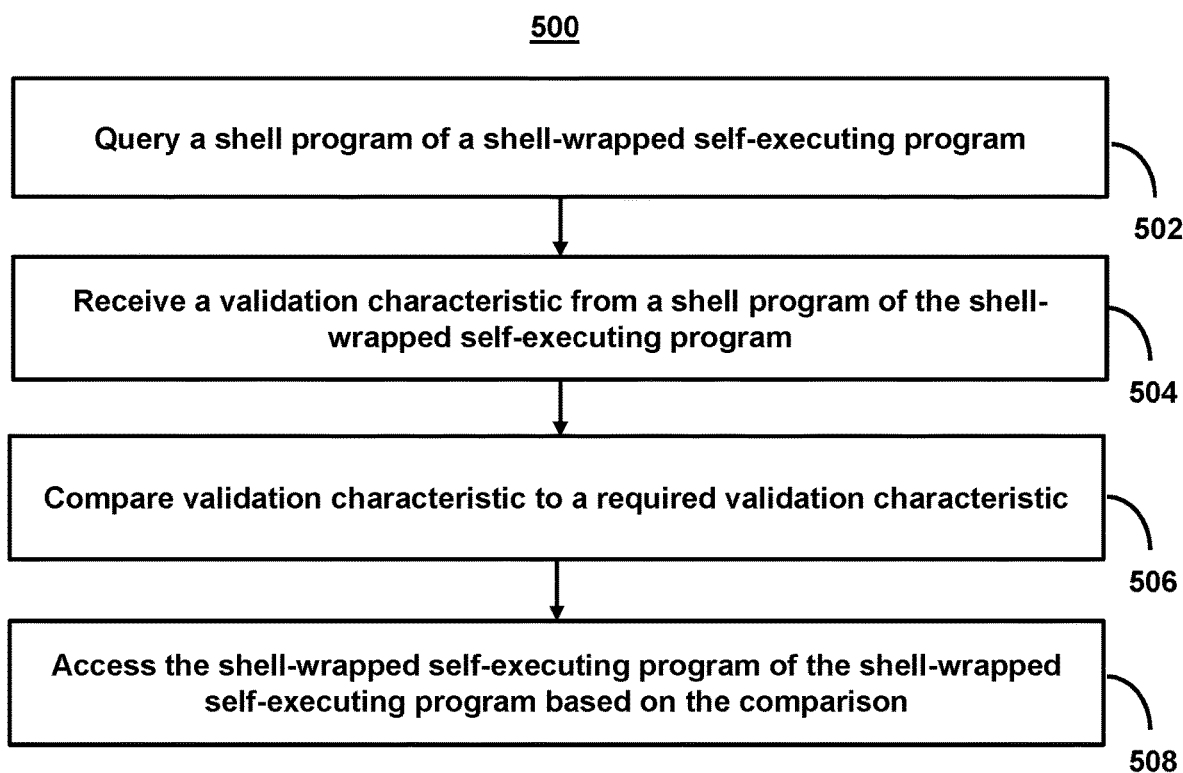
FIG. 5 shows a flowchart of the steps involved in validating a shell-wrapped self-executing program, in accordance with one or more embodiments.

FIG. 5 shows a flowchart of the steps involved in validating a shell-wrapped self-executing program, in accordance with one or more embodiments. For example, process 500 may be used to use shell-wrapped self-executing programs for conducting cryptographically secure blockchain actions on public, non-permissioned blockchain networks that are cryptographically secure. For example, the system may be used to read the characteristics of the self-executing programs on a blockchain and their associated resources (e.g., oracles, centralized databases, blockchain bridges). This system may continuously traverse one or more blockchain and scan, analyze, classify, map and monitor (e.g., for changes) the topology of self-executing programs and associated resources across each and all of them. This information may then be outputted to (or archived by) a first party security information and event management module that, according to an associated rules engine, may proactively grant access rights to self-executing program that provide sufficient validation information and restrict traffic to those that do not.

At step 502, process 500 (e.g., using one or more components described above) queries a shell program of a shell-wrapped self-executing program. For example, the system may query a shell program of a shell-wrapped self-executing program requesting a required validation characteristic prior to requesting that a self-executing program of the shell-wrapped self-executing program perform a first blockchain action. For example, a requesting entity may transmit a request to perform a transaction. Prior to performing the transaction, however, the requesting entity may require the self-executing program to meet certain validation requirements. The requesting entity may determine whether these validation requirements are met based on information provided by the shell program of the shell-wrapped self-executing program.

At step 504, process 500 (e.g., using one or more components described above) receives a validation characteristic from a shell program of the shell-wrapped self-executing program. For example, the system may receive from the shell program of the shell-wrapped self-executing program the validation characteristic.

As such, a requesting entity (e.g., a legacy computing system and/or another self-executing program) that requests to access the self-executing program may first receive information about the validation (if any) of the self-executing program. For example, such validation may cover subjects such as functionality verification (e.g., formal verification), performance optimization and minimization of network resource usage, potential security vulnerabilities, and lack of trustworthy data feeds (e.g., security, data correctness). As the request is interfacing with the shell program as opposed to the underlying self-executing program, the request does not run the risk of corruption or unexpected behavior by accessing the code of the self-executing program directly. Accordingly, any entity wishing to access self-executing programs on a blockchain may first interface with the shell program to determine a risk associated with the underlying self-executing program. By doing so, the entity may receive an output from the shell program indicating a particular validation method, validation protocol, and/or source of the self-executing program or its underlying code. For example, the shell program may output one or more validation characteristics.

At step 506, process 500 (e.g., using one or more components described above) compares the validation characteristic to a required validation characteristic. For example, the system may determine, based on the validation characteristic, whether the shell-wrapped self-executing program corresponds to a required validation characteristic.

In some embodiments, the system (e.g., a requesting entity) may determine whether a self-executing program has a required security certificate. For example, the system may use the shell program to ensure that required security measures are met prior to executing a blockchain action of the self-executing program. For example, a security certificate may be used as a means to determine the security level of a program. The security certificate may comprise a digital certificate such as a Secure Socket Layer (SSL) certificate, a specific public and/or private key, etc.

For example, the system may determine, based on the validation characteristic, a security certificate for the self-executing program. The system may then determine, based on the required validation characteristic, a security certificate requirement of the requesting entity for executing a blockchain action using the self-executing program of the shell-wrapped self-executing program. The system may then determine whether the security certificate corresponds to the security certificate requirement.

In some embodiments, the system may determine whether a self-executing program has a specific code origination identifier. For example, the system may use the shell program to ensure that requests from a particular entity are only executed using self-executing programs that originated from a specific entity and/or was coded by a specific entity (e.g., as indicated by the code origination identifier requirement). For example, the code origination identifier may include an entity from which the self-executing program was issued, authored, coded, and/or otherwise originated from. In some cases, the system may identify the entity based on a specific address and/or unique identifier corresponding to the code origination identifier.

For example, the system may determine, based on the validation characteristic, a code origination identifier for the self-executing program. The system may determine, based on the required validation characteristic, a code origination identifier requirement of the requesting entity for executing a blockchain action using the self-executing program of the shell-wrapped self-executing program. The system may determine whether the code origination identifier corresponds to the code origination identifier requirement.

In some embodiments, the system may determine whether a self-executing program has a specific program validator. For example, the system may use the shell program to ensure that only requests that have been vetted and/or validated by a particular entity (e.g., indicated by the program validator requirement) are able to execute the second self-executing program. For example, a program validator may be a specific entity that investigates/validates what a program does through the higher-level language the program is written in, without having to read machine code. In some cases, the system may identify the program validator based on a specific address and/or unique identifier.

For example, the system may determine, based on the validation characteristic, a program validator for the self-executing program. The system may determine, based on the required validation characteristic, a program validator requirement of the requesting entity for executing a first blockchain action using the self-executing program of the shell-wrapped self-executing program. The system may determine whether the program validator corresponds to the program validator requirement.

In some embodiments, the system may determine whether a self-executing program has a specific program validation procedure. For example, the system may use the shell program to ensure that only requests that have been vetted and/or validated using a particular program validation procedure (e.g., indicated by the program validation procedure requirement) are able to execute the second self-executing program. For example, a program validation procedure may investigate/validate what a program does through the higher-level language the program is written in, without having to read machine code.

For example, the system may determine, based on the validation characteristic, a program testing protocol procedure for the self-executing program. The system may determine, based on the required validation characteristic, a program testing protocol requirement of the requesting entity for executing a first blockchain action using the self-executing program of the shell-wrapped self-executing program. The system may determine whether the program testing protocol corresponds to the program testing protocol requirement.

In some embodiments, the system may determine whether a self-executing program has met a specific notification requirement. For example, the system may use the shell program to ensure that only self-executing programs that have met these additional requirements (e.g., indicated by the required validation characteristic) are used. For example, the notification requirement may require another entity to be notified of the self-executing program and/or the blockchain action prior to execution. Additionally, or alternatively, the notification requirement may require other information, such as a confirmation of the notification, an approval of the blockchain action, etc. For example, a third party may have an option to perform the blockchain action (e.g., a right of first refusal) prior to the blockchain action being executed in response to the self-executing program.

For example, the system may determine, based on the validation characteristic, a notification requirement for the self-executing program, wherein the notification requirement notifies an entity of the self-executing program potential for execution and/or likely execution. The system may receive a confirmation that the notification requirement has been satisfied. The system may determine that the response satisfies the required validation characteristic.

In some embodiments, the system may determine whether a self-executing program has a specific protocol and/or supports a specific protocol. For example, the system may use the shell program to ensure that only programs that support specific protocols (e.g., know-your-customer protocols, cross-chain protocol, etc.) are used to execute the blockchain action.

For example, the system may determine, based on the validation characteristic, a supported protocol for the self-executing program. The system may determine, based on the required validation characteristic, a protocol requirement of the requesting entity for executing a blockchain action using the self-executing program of the shell-wrapped self-executing program. The system may determine whether the supported protocol corresponds to the protocol requirement.

In some embodiments, the system may determine whether a self-executing program and/or the blockchain action is using a specific digital asset type (e.g., a specific cryptocurrency, token type, etc.). For example, the system may use the shell program to ensure that only programs and/or blockchain actions using a particular digital asset type are used to execute the blockchain action.

For example, the system may determine, based on the validation characteristic, a digital asset type for the self-executing program. The system may determine, based on the required validation characteristic, a digital asset type requirement of the requesting entity for executing a blockchain action using the self-executing program of the shell-wrapped self-executing program. The system may determine whether the digital asset type corresponds to the digital asset type requirement.

In some embodiments, the system may determine whether a self-executing program and/or the blockchain action supports synthetic assets. For example, the system may use the shell program to ensure that only programs that support synthetic assets are able to execute the self-executing program. By doing so, the system may ensure that the self-executing program does not fail (e.g., if the self-executing program relies on a synthetic asset).

For example, the system may determine, based on the validation characteristic, a synthetic asset support for the self-executing program. The system may determine, based on the required validation characteristic, a synthetic asset support requirement of the requesting entity for executing a blockchain action using the self-executing program of the shell-wrapped self-executing program. The system may determine whether the synthetic asset support corresponds to the synthetic asset support requirement.

In some embodiments, the system may determine whether a self-executing program has a required ring signature. A ring signature is a type of digital signature that can be performed by any member of a set of users that each have keys. The system may use the shell program to ensure that at least one of the users has approved the self-executing program prior to executing the blockchain action of the second self-executing program.

For example, the system may determine, based on the validation characteristic, a ring signature for the self-executing program. The system may determine, based on the required validation characteristic, a ring signature requirement of the requesting entity for executing a blockchain action using the self-executing program of the shell-wrapped self-executing program. The system may determine whether the ring signature corresponds to the ring signature requirement.

In some embodiments, the system may determine whether a self-executing program has a required Multi-Party Computation (MPC) signature. MPC enables multiple parties to evaluate a computation without revealing any of their private data to computing parties. This allows for transactions to be processed without the need for private keys, eliminating the only possible attack vector that could exist in a decentralized custody model. The system may use the shell program to ensure that request has been approved by the MPC signing protocol prior to executing the blockchain action of the second self-executing program. It should be noted that as described above, communications with one or more of the self-executing programs may be encrypted to prevent data leakage. For example, signing parties, the number of signatures, and/or other details related to a signing protocol may be encrypted.

For example, the system may determine, based on the validation characteristic, an MPC signature for the self-executing program. The system may determine, based on the required validation characteristic, an MPC signature requirement of the requesting entity for executing a blockchain action using the self-executing program of the shell-wrapped self-executing program. The system may determine whether the MPC signature corresponds to the MPC signature requirement.

MPC involves the use of multiple parties, each of which holds respective private data that may be used to evaluate a computation without ever revealing any of the private data held by each party. For example, each party of the multiple parties may possess private data (e.g., $d_1, d_2, \ldots, d_N$).

Together, the parties may use their respective private data to compute a value of a public function: (e.g., $F(d_1, d_2, \ldots, d_N)$). While the private data is used to compute a value based on the function, the private data is kept private during that process. In some embodiments, the shell-wrapped self-executing program may require a particular value that results from the MPC algorithm as a required validation characteristic.

The use of an MPC-based key lessens the risk involved with the loss of a private key and/or the private key being accessed by unauthorized parties. For example, conventional key-share systems rely on a public-private key configuration where the security of the system is tied to the private key remaining private. In some cases, these keys are stored in various cryptography-based digital repositories (or digital wallets). These digital wallets may have various configurations, typically categorized by whether the private key is held online or offline. For example, a hot storage wallet has a private key held online. A cold storage wallet has a private key held offline, and a hardware wallet has a private key held offline and on a physical device (e.g., a thumb drive). While holding a private key offline and/or tying the private key to a physical device is beneficial from a security perspective, this creates practical problems when attempting to conduct operations using the digital wallet. For example, to conduct an operation, a user must be able to access the private key from its offline location and/or the physical device. This is particularly burdensome for MPC-based key operations as it requires each user (e.g., corresponding to a respective private key) to be available at a given time. In some embodiments, the shell-wrapped self-executing program may require a particular storage type or storage configuration as a required validation characteristic.

Furthermore, the use of a private key stored at an offline location and/or the physical device increases the risk that the offline location becomes inaccessible and/or the physical device is lost. In such cases, the digital wallet and any digital assets therein may be lost as well. This creates a critical flaw in MPC-based key operations, as the loss of any one key may result in the loss of digital assets for all of the parties. The methods and systems described herein overcome this problem through the use of threshold signing requirements, separate approval and signing policies, independent key recovery mechanisms, and cohort/group key creation. More specifically, the methods and systems described herein alleviate flaws in the MPC-based key operations by creating MPC-based key operations in which the MPC relies on partial private keys. In such cases, a partial private key is maintained online (e.g., in a hot wallet), whereas other partial private keys may remain offline. Furthermore, due to the use of the partial private keys, the exposure of the online partial private key does not in and of itself create a security risk (e.g., as multiple partial private keys, including an offline partial key, are required for conducting blockchain operations), and the loss of the offline partial private key (e.g., stored on a user device) does not create a risk of the loss of digital assets (e.g., as the online partial private key may be used to recover the offline private partial key). In some embodiments, the shell-wrapped self-executing program may require a particular storage location (or digital wallet type) as a required validation characteristic.

The MPC-based key operations maintain flexibility in the algorithm used. For example, the system may use online MPC algorithms, such as the Gennaro and Goldfeder MPC algorithm and the Lindell et al. MPC algorithm. The online MPC algorithms have two limitations that restrict their use in conventional systems. First, they require users to wait for blockchain operations to undergo up to eight to twelve signatures rounds, which can create latency issues. Second, they require the use of online storage for private keys. Due to the use of partial private keys (e.g., comprised of an online and offline pair), the system may use online MPC algorithms. Furthermore, given that the online requirement for the online MPC algorithms is satisfied by the online partial private key, the system may use the online MPC algorithms while maintaining the offline partial private key (e.g., increasing overall security). In some embodiments, the shell-wrapped self-executing program may require a particular MPC algorithm be used by specifying the algorithm or result (e.g., in a format corresponding to the algorithm) as a required validation characteristic.

Additionally, the MPC-based key operations used by the system may include offline and/or online hybrid MPC algorithms. For example, the system may use MPC algorithms that include dynamic key refreshes (e.g., private key shares may be dynamically updated/modified at a given interval) and/or dynamic approval and/or signing policies. These dynamic policies are made possible by the online partial private key. Thus, the system introduces the enhanced security of dynamic systems, while still maintaining the security of offline systems (e.g., through the use of the offline partial private key).

Finally, the MPC-based key operations may use threshold key-signing policies in which only a threshold number of users (e.g., partial private keys corresponding to a user) are required. Upon determination by the system that the threshold is met, the system may allow a subsequent user (e.g., an online user) to finalize and perform a blockchain operation. As such, the system allows for the use of MPC-based key operations without requiring all parties to be online and/or available at the same time. In some embodiments, the shell-wrapped self-executing program may require a particular threshold as a required validation characteristic.

At step 508, process 500 (e.g., using one or more components described above) accesses the shell-wrapped self-executing program of the shell-wrapped self-executing program based on the comparison. For example, the system may, in response to determining that the validation characteristic corresponds to the required validation characteristic, process the first blockchain action with the self-executing program of the shell-wrapped self-executing program.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating and/or using shell-wrapped self-executing programs for conducting cryptographically secure blockchain actions on public, non-permissioned blockchain networks that are cryptographically secure.

2. The method of any one of the preceding embodiments, further comprising: receiving a self-executing program for publication in an encrypted format on a cryptographically secure network; receiving a cryptographically secure validation characteristic, wherein the validation characteristic indicates an input for entities attempting to validate the self-executing program; generating a shell program for interacting with requests to access the self-executing program, wherein the shell program encrypts the self-executing program in the encrypted format on the cryptographically secure network, and wherein the shell program outputs the validation characteristic in response to the requests; generating a shell-wrapped self-executing program by encrypting the self-executing program in the encrypted format with the shell program; and publishing the shell-wrapped self-executing program to the cryptographically secure network.

3. The method of any one of the preceding embodiments, wherein the validation characteristic is used by a requesting entity to validate the self-executing program according to a required validation characteristic by: determining, based on the validation characteristic, a security certificate for the self-executing program; determining, based on the required validation characteristic, a security certificate requirement of the requesting entity for executing a first blockchain action using the self-executing program of the shell-wrapped self-executing program; and determining whether the security certificate corresponds to the security certificate requirement.

4. The method of any one of the preceding embodiments, wherein the validation characteristic is used by a requesting entity to validate the self-executing program according to a required validation characteristic by: determining, based on the validation characteristic, a code origination identifier for the self-executing program; determining, based on the required validation characteristic, a code origination identifier requirement of the requesting entity for executing a first blockchain action using the self-executing program of the shell-wrapped self-executing program; and determining whether the code origination identifier corresponds to the code origination identifier requirement.

5. The method of any one of the preceding embodiments, wherein the validation characteristic is used by a requesting entity to validate the self-executing program according to a required validation characteristic by: determining, based on the validation characteristic, a program validator for the self-executing program; determining, based on the required validation characteristic, a program validator requirement of the requesting entity for executing a first blockchain action using the self-executing program of the shell-wrapped self-executing program; and determining whether the program validator corresponds to the program validator requirement.

6. The method of any one of the preceding embodiments, wherein the validation characteristic is used by a requesting entity to validate the self-executing program according to a required validation characteristic by: determining, based on the validation characteristic, a program validation procedure for the self-executing program; determining, based on the required validation characteristic, a program validation procedure requirement of the requesting entity for executing a first blockchain action using the self-executing program of the shell-wrapped self-executing program; and determining whether the program validation procedure corresponds to the program validation procedure requirement.

7. The method of any one of the preceding embodiments, wherein the validation characteristic is used by a requesting entity to validate the self-executing program according to a required validation characteristic by: determining, based on the validation characteristic, a program testing protocol procedure for the self-executing program; determining, based on the required validation characteristic, a program testing protocol requirement of the requesting entity for executing a first blockchain action using the self-executing program of the shell-wrapped self-executing program; and determining whether the program testing protocol corresponds to the program testing protocol requirement.

8. The method of any one of the preceding embodiments, wherein the validation characteristic is used by a requesting entity to validate the self-executing program according to a required validation characteristic by: determining, based on the validation characteristic, a notification requirement for the self-executing program, wherein the notification requirement notifies an entity of the self-executing program; receiving a confirmation that the notification requirement has been satisfied; and determining that the response satisfies the required validation characteristic.

9. The method of any one of the preceding embodiments, wherein the validation characteristic is used by a requesting entity to validate the self-executing program according to a required validation characteristic by: determining, based on the validation characteristic, a supported protocol for the self-executing program; determining, based on the required validation characteristic, a protocol requirement of the requesting entity for executing a first blockchain action using the self-executing program of the shell-wrapped self-executing program; and determining whether the supported protocol corresponds to the protocol requirement.

10. The method of any one of the preceding embodiments, wherein the validation characteristic is used by a requesting entity to validate the self-executing program according to a required validation characteristic by: determining, based on the validation characteristic, a digital asset type for the self-executing program; determining, based on the required validation characteristic, a digital asset type requirement of the requesting entity for executing a first blockchain action using the self-executing program of the shell-wrapped self-executing program; and determining whether the digital asset type corresponds to the digital asset type requirement.

11. The method of any one of the preceding embodiments, wherein the validation characteristic is used by a requesting entity to validate the self-executing program according to a required validation characteristic by: determining, based on the validation characteristic, a synthetic asset support for the self-executing program; determining, based on the required validation characteristic, a synthetic asset support requirement of the requesting entity for executing a first blockchain action using the self-executing program of the shell-wrapped self-executing program; and determining whether the synthetic asset support corresponds to the synthetic asset support requirement.

12. The method of any one of the preceding embodiments, wherein the validation characteristic is used by a requesting entity to validate the self-executing program according to a required validation characteristic by: determining, based on the validation characteristic, a ring signature for the self-executing program; determining, based on the required validation characteristic, a ring signature requirement of the requesting entity for executing a first blockchain action using the self-executing program of the shell-wrapped self-executing program; and determining whether the ring signature corresponds to the ring signature requirement.

13. The method of any one of the preceding embodiments, wherein the validation characteristic is used by a requesting entity to validate the self-executing program according to a required validation characteristic by: determining, based on the validation characteristic, a Multi-Party Computation (MPC) signature for the self-executing program; determining, based on the required validation characteristic, an MPC signature requirement of the requesting entity for executing a first blockchain action using the self-executing program of the shell-wrapped self-executing program; and determining whether the MPC signature corresponds to the MPC signature requirement.

14. The method of any one of the preceding embodiments, further comprising: querying a shell program of a shell-wrapped self-executing program requesting a required validation characteristic prior to requesting that a self-executing program of the shell-wrapped self-executing program perform a first blockchain action; receiving from the shell program of the shell-wrapped self-executing program the validation characteristic; determining, based on the validation characteristic, whether the shell-wrapped self-executing program corresponds to a required validation characteristic; and in response to determining that the validation characteristic corresponds to the required validation characteristic, processing the first blockchain action with the self-executing program of the shell-wrapped self-executing program.

15. The method of any one of the preceding embodiments, wherein determining, based on the validation characteristic, whether the shell-wrapped self-executing program corresponds to the required validation characteristic further comprises: determining, based on the validation characteristic, a security certificate for the self-executing program; determining, based on the required validation characteristic, a security certificate requirement of the requesting entity for executing a first blockchain action using the self-executing program of the shell-wrapped self-executing program; and determining whether the security certificate corresponds to the security certificate requirement.

16. The method of any one of the preceding embodiments, wherein determining, based on the validation characteristic, whether the shell-wrapped self-executing program corresponds to the required validation characteristic further comprises: determining, based on the validation characteristic, a code origination identifier for the self-executing program; determining, based on the required validation characteristic, a code origination identifier requirement of the requesting entity for executing a first blockchain action using the self-executing program of the shell-wrapped self-executing program; and determining whether the code origination identifier corresponds to the code origination identifier requirement.

17. The method of any one of the preceding embodiments, wherein determining, based on the validation characteristic, whether the shell-wrapped self-executing program corresponds to the required validation characteristic further comprises: determining, based on the validation characteristic, a program validator for the self-executing program; determining, based on the required validation characteristic, a program validator requirement of the requesting entity for executing a first blockchain action using the self-executing program of the shell-wrapped self-executing program; and determining whether the program validator corresponds to the program validator requirement.

18. The method of any one of the preceding embodiments, wherein determining, based on the validation characteristic, whether the shell-wrapped self-executing program corresponds to the required validation characteristic further comprises: determining, based on the validation characteristic, a program validation procedure for the self-executing program; determining, based on the required validation characteristic, a program validation procedure requirement of the requesting entity for executing a first blockchain action using the self-executing program of the shell-wrapped self-executing program; and determining whether the program validation procedure corresponds to the program validation procedure requirement.

19. The method of any one of the preceding embodiments, wherein determining, based on the validation characteristic, whether the shell-wrapped self-executing program corresponds to the required validation characteristic further comprises: determining, based on the validation characteristic, a program testing protocol procedure for the self-executing program; determining, based on the required validation characteristic, a program testing protocol requirement of the requesting entity for executing a first blockchain action using the self-executing program of the shell-wrapped self-executing program; and determining whether the program testing protocol corresponds to the program testing protocol requirement.

20. The method of any one of the preceding embodiments, wherein determining, based on the validation characteristic, whether the shell-wrapped self-executing program corresponds to the required validation characteristic further comprises: determining, based on the validation characteristic, a notification requirement for the self-executing program, wherein the notification requirement notifies an entity of the self-executing program; receiving a confirmation that the notification requirement has been satisfied; and determining that the response satisfies the required validation characteristic.

21. A tangible, non-transitory, machine-readable medium storing instructions that, when executed by a data processing apparatus, cause the data processing apparatus to perform operations comprising those of any of embodiments 1-20.

22. A system comprising one or more processors and memory storing instructions that, when executed by the processors, cause the processors to effectuate operations comprising those of any of embodiments 1-20.

23. A system comprising means for performing any of embodiments 1-20.

What is claimed is:

1. A system for generating shell-wrapped self-executing programs for conducting cryptographically secure blockchain actions on public, non-permissioned blockchain networks that are cryptographically secure, the system comprising:
   a first blockchain node for a cryptographically secure network, wherein the first blockchain node comprises a first set of one or more processors; and
   a first non-transitory, computer-readable medium having instructions recorded thereon that, when executed by the first set of first set of one or more processors, causes a first set of operations comprising:
      receiving, from a first entity, a self-executing program for publication in an encrypted format on the cryptographically secure network;
      receiving a cryptographically secure validation characteristic, wherein the validation characteristic indicates an input for entities attempting to validate the self-executing program;
      generating a shell program for interacting with requests to access the self-executing program, wherein the shell program encrypts the self-executing program in the encrypted format on the cryptographically secure network, and wherein the shell program outputs the validation characteristic in response to the requests;
      generating a shell-wrapped self-executing program by encrypting the self-executing program in the encrypted format with the shell program; and
      publishing the shell-wrapped self-executing program to the cryptographically secure network;
   a second blockchain node for the cryptographically secure network, wherein the second blockchain node comprises a second set of one or more processors; and
   a second non-transitory, computer-readable medium having instructions recorded thereon that, when executed by the second set of first set of one or more processors, causes a second set of operations comprising:
      querying a shell program of the shell-wrapped self-executing program requesting a required validation characteristic prior to requesting that the self-executing program of the shell-wrapped self-executing program perform a first blockchain action;
      receiving from the shell program of the shell-wrapped self-executing program the validation characteristic;
      determining, based on the validation characteristic, whether the shell-wrapped self-executing program corresponds to the required validation characteristic for a second entity; and
      in response to determining that the validation characteristic corresponds to the required validation characteristic, processing the first blockchain action with the self-executing program of the shell-wrapped self-executing program.

2. A method for generating shell-wrapped self-executing programs for conducting cryptographically secure blockchain actions on public, non-permissioned blockchain networks that are cryptographically secure, the method comprising:
   receiving a self-executing program for publication in an encrypted format on a cryptographically secure network;
   receiving a cryptographically secure validation characteristic, wherein the validation characteristic indicates an input for entities attempting to validate the self-executing program;
   generating a shell program for interacting with requests to access the self-executing program, wherein the shell program encrypts the self-executing program in the encrypted format on the cryptographically secure network, and wherein the shell program outputs the validation characteristic in response to the requests;
   generating a shell-wrapped self-executing program by encrypting the self-executing program in the encrypted format with the shell program; and
   publishing the shell-wrapped self-executing program to the cryptographically secure network.

3. The method of claim 2, wherein the validation characteristic is used by a requesting entity to validate the self-executing program according to a required validation characteristic by:
   determining, based on the validation characteristic, a security certificate for the self-executing program;
   determining, based on the required validation characteristic, a security certificate requirement of the requesting entity for executing a first blockchain action using the self-executing program of the shell-wrapped self-executing program; and determining whether the security certificate corresponds to the security certificate requirement.

4. The method of claim 2, wherein the validation characteristic is used by a requesting entity to validate the self-executing program according to a required validation characteristic by:
   determining, based on the validation characteristic, a code origination identifier for the self-executing program;
   determining, based on the required validation characteristic, a code origination identifier requirement of the requesting entity for executing a first blockchain action using the self-executing program of the shell-wrapped self-executing program; and
   determining whether the code origination identifier corresponds to the code origination identifier requirement.

5. The method of claim 2, wherein the validation characteristic is used by a requesting entity to validate the self-executing program according to a required validation characteristic by:
   determining, based on the validation characteristic, a program validator for the self-executing program;
   determining, based on the required validation characteristic, a program validator requirement of the requesting entity for executing a first blockchain action using the self-executing program of the shell-wrapped self-executing program; and
   determining whether the program validator corresponds to the program validator requirement.

6. The method of claim 2, wherein the validation characteristic is used by a requesting entity to validate the self-executing program according to a required validation characteristic by:
   determining, based on the validation characteristic, a program validation procedure for the self-executing program;
   determining, based on the required validation characteristic, a program validation procedure requirement of the requesting entity for executing a first blockchain action using the self-executing program of the shell-wrapped self-executing program; and
   determining whether the program validation procedure corresponds to the program validation procedure requirement.

7. The method of claim 2, wherein the validation characteristic is used by a requesting entity to validate the self-executing program according to a required validation characteristic by:
   determining, based on the validation characteristic, a program testing protocol procedure for the self-executing program;
   determining, based on the required validation characteristic, a program testing protocol requirement of the requesting entity for executing a first blockchain action using the self-executing program of the shell-wrapped self-executing program; and
   determining whether the program testing protocol corresponds to the program testing protocol requirement.

8. The method of claim 2, wherein the validation characteristic is used by a requesting entity to validate the self-executing program according to a required validation characteristic by:
   determining, based on the validation characteristic, a notification requirement for the self-executing program, wherein the notification requirement notifies an entity of the self-executing program;
   receiving a confirmation that the notification requirement has been satisfied; and
   determining that the response satisfies the required validation characteristic.

9. The method of claim 2, wherein the validation characteristic is used by a requesting entity to validate the self-executing program according to a required validation characteristic by:
   determining, based on the validation characteristic, a supported protocol for the self-executing program;
   determining, based on the required validation characteristic, a protocol requirement of the requesting entity for executing a first blockchain action using the self-executing program of the shell-wrapped self-executing program; and
   determining whether the supported protocol corresponds to the protocol requirement.

10. The method of claim 2, wherein the validation characteristic is used by a requesting entity to validate the self-executing program according to a required validation characteristic by:
    determining, based on the validation characteristic, a digital asset type for the self-executing program;
    determining, based on the required validation characteristic, a digital asset type requirement of the requesting entity for executing a first blockchain action using the self-executing program of the shell-wrapped self-executing program; and
    determining whether the digital asset type corresponds to the digital asset type requirement.

11. The method of claim 2, wherein the validation characteristic is used by a requesting entity to validate the self-executing program according to a required validation characteristic by:
    determining, based on the validation characteristic, a synthetic asset support for the self-executing program;
    determining, based on the required validation characteristic, a synthetic asset support requirement of the requesting entity for executing a first blockchain action using the self-executing program of the shell-wrapped self-executing program; and
    determining whether the synthetic asset support corresponds to the synthetic asset support requirement.

12. The method of claim 2, wherein the validation characteristic is used by a requesting entity to validate the self-executing program according to a required validation characteristic by:
    determining, based on the validation characteristic, a ring signature for the self-executing program;
    determining, based on the required validation characteristic, a ring signature requirement of the requesting entity for executing a first blockchain action using the self-executing program of the shell-wrapped self-executing program; and
    determining whether the ring signature corresponds to the ring signature requirement.

13. The method of claim 2, wherein the validation characteristic is used by a requesting entity to validate the self-executing program according to a required validation characteristic by:
    determining, based on the validation characteristic, a Multi-Party Computation (MPC) signature for the self-executing program;
    determining, based on the required validation characteristic, an MPC signature requirement of the requesting entity for executing a first blockchain action using the self-executing program of the shell-wrapped self-executing program; and determining whether the MPC signature corresponds to the MPC signature requirement.

14. A non-transitory, computer-readable medium, comprising instructions that, when executed by one or more processors, cause operations comprising:
querying a shell program of a shell-wrapped self-executing program requesting a required validation characteristic prior to requesting that a self-executing program of the shell-wrapped self-executing program perform a first blockchain action;
receiving from the shell program of the shell-wrapped self-executing program the validation characteristic;
determining, based on the validation characteristic, whether the shell-wrapped self-executing program corresponds to a required validation characteristic of a requesting entity; and
in response to determining that the validation characteristic corresponds to the required validation characteristic, processing the first blockchain action with the self-executing program of the shell-wrapped self-executing program.

15. The non-transitory, computer-readable medium of claim 14, wherein determining, based on the validation characteristic, whether the shell-wrapped self-executing program corresponds to the required validation characteristic further comprises:
determining, based on the validation characteristic, a security certificate for the self-executing program;
determining, based on the required validation characteristic, a security certificate requirement of the requesting entity for executing a first blockchain action using the self-executing program of the shell-wrapped self-executing program; and
determining whether the security certificate corresponds to the security certificate requirement.

16. The non-transitory, computer-readable medium of claim 14, wherein determining, based on the validation characteristic, whether the shell-wrapped self-executing program corresponds to the required validation characteristic further comprises:
determining, based on the validation characteristic, a code origination identifier for the self-executing program;
determining, based on the required validation characteristic, a code origination identifier requirement of the requesting entity for executing a first blockchain action using the self-executing program of the shell-wrapped self-executing program; and
determining whether the code origination identifier corresponds to the code origination identifier requirement.

17. The non-transitory, computer-readable medium of claim 14, wherein determining, based on the validation characteristic, whether the shell-wrapped self-executing program corresponds to the required validation characteristic further comprises:
determining, based on the validation characteristic, a program validator for the self-executing program;
determining, based on the required validation characteristic, a program validator requirement of the requesting entity for executing a first blockchain action using the self-executing program of the shell-wrapped self-executing program; and
determining whether the program validator corresponds to the program validator requirement.

18. The non-transitory, computer-readable medium of claim 14, wherein determining, based on the validation characteristic, whether the shell-wrapped self-executing program corresponds to the required validation characteristic further comprises:
determining, based on the validation characteristic, a program validation procedure for the self-executing program;
determining, based on the required validation characteristic, a program validation procedure requirement of the requesting entity for executing a first blockchain action using the self-executing program of the shell-wrapped self-executing program; and
determining whether the program validation procedure corresponds to the program validation procedure requirement.

19. The non-transitory, computer-readable medium of claim 14, wherein determining, based on the validation characteristic, whether the shell-wrapped self-executing program corresponds to the required validation characteristic further comprises:
determining, based on the validation characteristic, a program testing protocol procedure for the self-executing program;
determining, based on the required validation characteristic, a program testing protocol requirement of the requesting entity for executing a first blockchain action using the self-executing program of the shell-wrapped self-executing program; and
determining whether the program testing protocol corresponds to the program testing protocol requirement.

20. The non-transitory, computer-readable medium of claim 14, wherein determining, based on the validation characteristic, whether the shell-wrapped self-executing program corresponds to the required validation characteristic further comprises:
determining, based on the validation characteristic, a notification requirement for the self-executing program, wherein the notification requirement notifies an entity of the self-executing program;
receiving a confirmation that the notification requirement has been satisfied; and
determining that the response satisfies the required validation characteristic.

* * * * *